United States Patent [19]
Mestha et al.

[11] Patent Number: 6,052,195
[45] Date of Patent: Apr. 18, 2000

[54] AUTOMATIC COLORANT MIXING METHOD AND APPARATUS

[75] Inventors: Lingappa K. Mestha, Fairport; Sohail A. Dianat, Pittsford; Michael J. Rice, Webster; Edward B. Caruthers; R. Enrique Viturro, both of Rochester, all of N.Y.

[73] Assignee: Xerox Corporation, Stamford, Conn.

[21] Appl. No.: 09/083,114

[22] Filed: May 22, 1998

[51] Int. Cl.[7] ..................................................... G01J 3/50
[52] U.S. Cl. ........................... 356/425; 356/402; 250/226
[58] Field of Search .................................. 356/402, 405, 356/406, 407, 409, 410, 414, 425; 250/226; 366/132

[56] References Cited

U.S. PATENT DOCUMENTS

| | | |
|---|---|---|
| 3,870,968 | 3/1975 | Vosteen et al. . |
| 4,205,257 | 5/1980 | Ogura et al. . |
| 4,403,866 | 9/1983 | Falcoff et al. ............................ 366/132 |
| 4,724,461 | 2/1988 | Rushing . |
| 4,853,639 | 8/1989 | Vosteen et al. . |
| 4,887,217 | 12/1989 | Sherman et al. ......................... 366/132 |
| 5,003,327 | 3/1991 | Theodoulou et al. . |
| 5,045,882 | 9/1991 | Roehrs et al. . |
| 5,243,383 | 9/1993 | Parisi . |
| 5,481,380 | 1/1996 | Bestmann . |
| 5,544,258 | 8/1996 | Levien . |
| 5,559,173 | 9/1996 | Campo et al. ............................ 356/425 |
| 5,646,656 | 7/1997 | Leonhardt et al. ....................... 347/43 |
| 5,662,044 | 9/1997 | Loffler et al. . |
| 5,664,072 | 9/1997 | Ueda et al. . |
| 5,708,916 | 1/1998 | Mestha . |
| 5,717,978 | 2/1998 | Mestha . |
| 5,734,407 | 3/1998 | Yamada et al. . |
| 5,748,221 | 5/1998 | Castelli et al. . |
| 5,749,019 | 5/1998 | Mestha . |
| 5,749,021 | 5/1998 | Mestha . |
| 5,754,918 | 5/1998 | Mestha et al. . |
| 5,812,903 | 9/1998 | Yamada et al. . |
| 5,822,079 | 10/1998 | Okuno et al. . |
| 5,884,118 | 3/1999 | Mestha et al. . |
| 5,967,044 | 10/1999 | Marschke ................................ 101/363 |

FOREIGN PATENT DOCUMENTS 4-314768  11/1992  Japan .

OTHER PUBLICATIONS

"Color Technology for Imaging Devices," Henry Kang, pp. 318–327 (undated).

"Miniature Lights for Miniature Spectrometers," Ocean Optics, Inc., (undated).

"Sequential Linear Interpolation of Multidimensional Functions," James Z. Chang et al., IEEE Transactions on Image Processing, vol. 6, No. 9, Sep. 1997.

*Primary Examiner*—F. L. Evans
*Attorney, Agent, or Firm*—Oliff & Berridge, PLC

[57] ABSTRACT

A method of mixing colorants to achieve a target color includes combining individual colorants, detecting an output color of the combined colorants with a color sensing device and automatically adjusting the output color based on comparison between the detected output color and the target color. An apparatus for mixing colorants according to this method is also disclosed.

32 Claims, 4 Drawing Sheets

AUTOMATIC COLORANT MIXING METHOD AND APPARATUS

BACKGROUND OF THE INVENTION

1. Related Applications

The subject matter of the present application is related to the subject matter of the applications "Dynamic Device Independent Image Correction Method and Apparatus" (attorney file no. 100219) U.S. patent application Ser. No. 09/083,203 filed May 22, 1998, and "Device Independent Color Controller and Method" (attorney file no. 100214) U.S. patent application Ser. No. 09/083,202 filed May 22, 1998 filed by the assignee, which are incorporated herein by reference.

2. Field of Invention

The present invention relates to a method and apparatus for automatically mixing colorants to achieve a desired target color, and in particular, to such a method and apparatus configured for use in an ink marking device.

3. Description of Related Art

Known methods and apparatus for mixing colorants to achieve a desired target color in pigment-based and dye-based applications involve human interaction, namely determining if the mixed colorants match the target color by visual inspection. For example, an experienced attendant of a paint mixing machine in a home improvement store will begin with a base color and add one or more other colors to achieve a customer's desired color. The attendant may refer to a predetermined paint mixing guide to determine which colors and how much of each color to add to the base color before beginning the mixing process. Alternatively, the attendant may access color formulations stored in a memory of a computer or similar device. After the paint is thoroughly mixed, the attendant will visually inspect the resulting color and confirm it matches the desired color.

More human interaction is required in the case of colors that have faded or otherwise been transformed, e.g., due to environmental exposure such as solar radiation or a saltwater environment. In these cases, although the identity and proportions of colorants comprising the original color designation may be known, the target color that must be matched is actually a variation (usually a lighter shade) of the original color. In general, achieving the target color in these cases requires repeated mixing and visual inspection steps, because there is no guide that can be consulted.

Other areas in which color mixing is carried out on a trial and error basis with visual inspection include offset printing, wallpapers, fabric coloring and automobile painting, among others. In offset printing, a printer seeking to match a special color will rely on experience and possibly some reference to basic colors in mixing various standard ink colors to match the special color.

Consumers now demand the flexibility to print and copy in colors not previously available in the normal color palette of conventional ink marking devices (e.g., copiers, printers, etc.). In conventional ink marking devices, color printing is typically carried out with four colors (cyan, magenta, yellow and black). Other colors are printed by applying these four colors in a halftone pattern. Thus, no mixing of the four colorants occurs in the conventional ink marking devices. This method is called process color. Instead, two or more of the colorants are printed in adjacent pixels. The eye blends the adjacent pixels, and the sensed color represents an averaging of the individual pixel colors.

The palette of conventional ink marking devices is limited, and many special colors cannot be reproduced. Accordingly, it would be desirable to provide a way to mix a greater range of colors in an ink marking device automatically. The resulting ink, made from a mixture of two or more color inks, is called a spot color or a custom color. The color gamut space obtained in this way is larger by a factor of two or more than the one obtained by process color. Such spot colors are typically printed as solids, rather than halftones. The printed solid spot colors are more spatially uniform than the overlapping halftones which provide the process color approximations to the customer-selected color.

To mix colors automatically, i.e., without the human interaction through visual inspection, the target color and the mixed color must be sensed so that they can be compared. Typical color sensing devices include calorimeters and spectrophotometers. Colorimeters are simpler devices that sense, e.g., the $L^*$, $a^*$ and $b^*$ characteristics of a particular color. Spectrophotometers are devices that measure light in terms of its intensity at each wavelength. The received light is decomposed into a spectrum, and particular wavelengths are recorded by corresponding photodiodes, photomultiplier arrays, etc.

Over time, a mixed color that originally matched the target color may drift such that a perceptible difference becomes apparent between the mixed color and the target color. Such a difference may arise for various reasons, including inconsistent mixing of the mixed color, changing environmental conditions, varying absorption properties of the media on which the color is being applied, etc. Thus, to match the target color accurately over time, the mixed color must be monitored and, if necessary, adjusted slightly, to minimize any perceptible difference.

SUMMARY OF THE INVENTION

According to a method of the present invention, colorants are mixed to achieve a target color by combining individual colorants, detecting an output color of the combined colorants with a color sensing device and automatically adjusting the output color based on comparison between the detected output color and the target color.

Preferably, the step of adjusting includes determining proportions of the colorants. Further, the step of combining preferably includes mixing the colorants in a container.

The step of detecting preferably includes measuring with a spectrophotometer the transmission spectra and/or the reflectance spectra of the target color. Further, the step of detecting preferably includes measuring with the spectrophotometer transmission spectra of the output color or a reflectance spectra of the output color.

Preferably, the method includes outputting the output color onto a medium. The step of outputting preferably includes outputting the output color onto an electrostatic image receiver. The steps of adjusting and outputting preferably occur concurrently. The step of adjusting preferably includes changing a portion of at least one of the colorants. The step of adjusting preferably includes adding at least one colorant and/or subtracting a portion of the combined colorants.

The step of detecting preferably includes measuring transmission spectra with a spectrophotometer and the step of adjusting preferably includes converting the measured transmission spectra into absorption spectra. The step of detecting preferably includes measuring transmission spectra with a spectrophotometer and the step of adjusting preferably includes converting the measured transmission spectra into measured control parameters. The step of converting the measured transmission spectra preferably includes a color space transformation. The step of converting preferably includes representing the measured transmission spectra with at least one of orthogonal basis functions, quasi-orthogonal basis functions, wavelet transforms, or functions obtained from experimental input-output data.

The method preferably includes retrieving a target color spectrum from memory.

The step of adjusting preferably includes calculating an arithmetic difference between the spectrum of the output color and the spectrum of the target color. Also, the step of adjusting preferably includes multiplying the arithmetic difference by a constant. Further, the step of adjusting preferably includes evaluating the arithmetic difference to determine if the combining step must be reinitialized. In addition, the step of adjusting preferably includes adding at least one colorant in accordance with the calculated arithmetic difference.

The step of adjusting preferably includes reinitializing by recombining the colorants in the known proportions if the calculated arithmetic difference is negative.

BRIEF DESCRIPTION OF THE DRAWINGS

Preferred embodiments of the invention will be described with reference to the following drawings, wherein like reference numerals refer to like elements, and wherein.

DETAILED DESCRIPTION OF PREFERRED EMBODIMENTS

Figure 1:
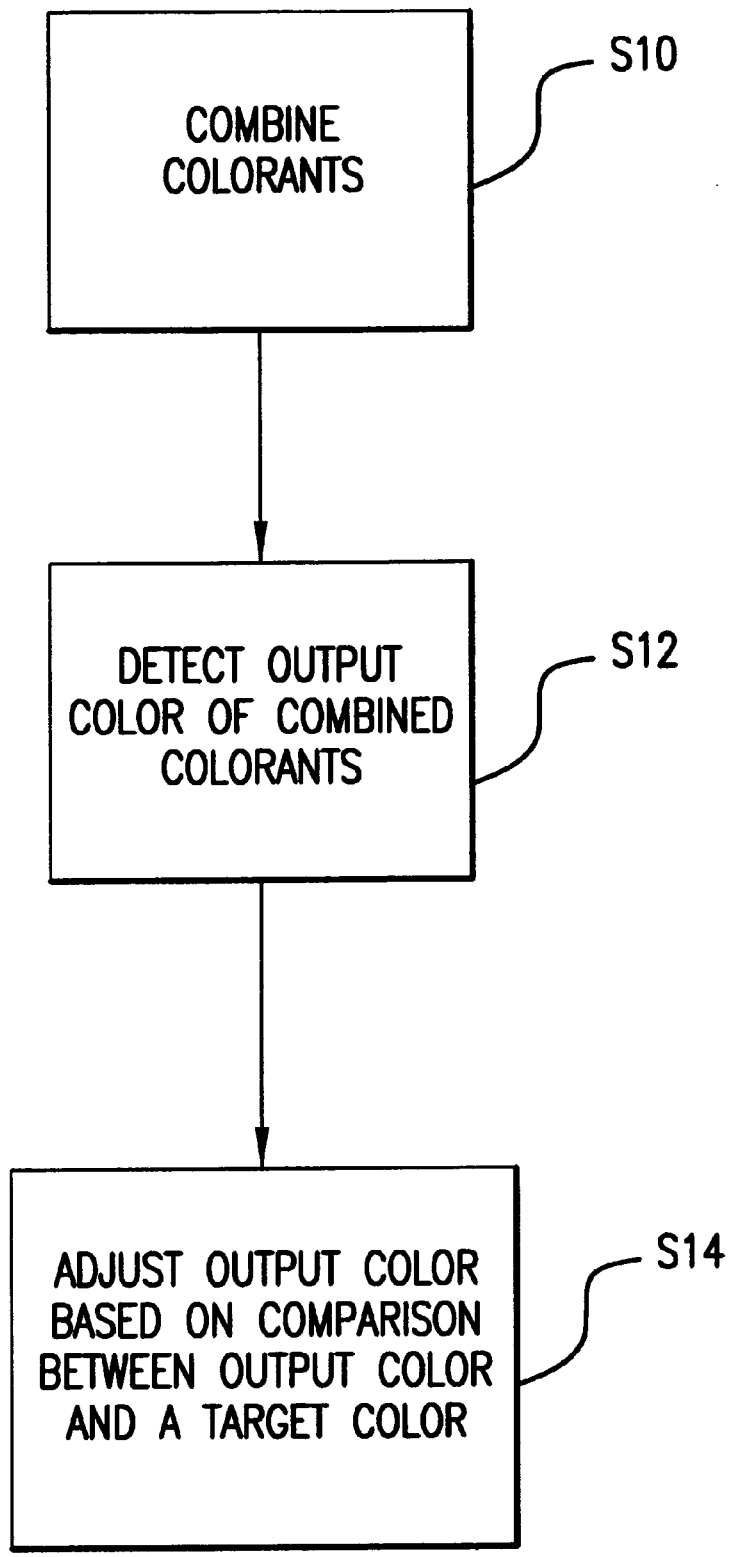
FIG. 1 is a flow chart showing a method of the invention.

In FIG. 1, the general method of the present invention is shown. In step S10, individual colorants are combined. In step S12, the output color of the combined colorants is detected. Subsequently, in step S14, the output color of the combined colorants is automatically adjusted by adding individual colorants and/or subtracting an amount of the colorant mixture based on a comparison between the detected output color and a target color.

Figure 2:
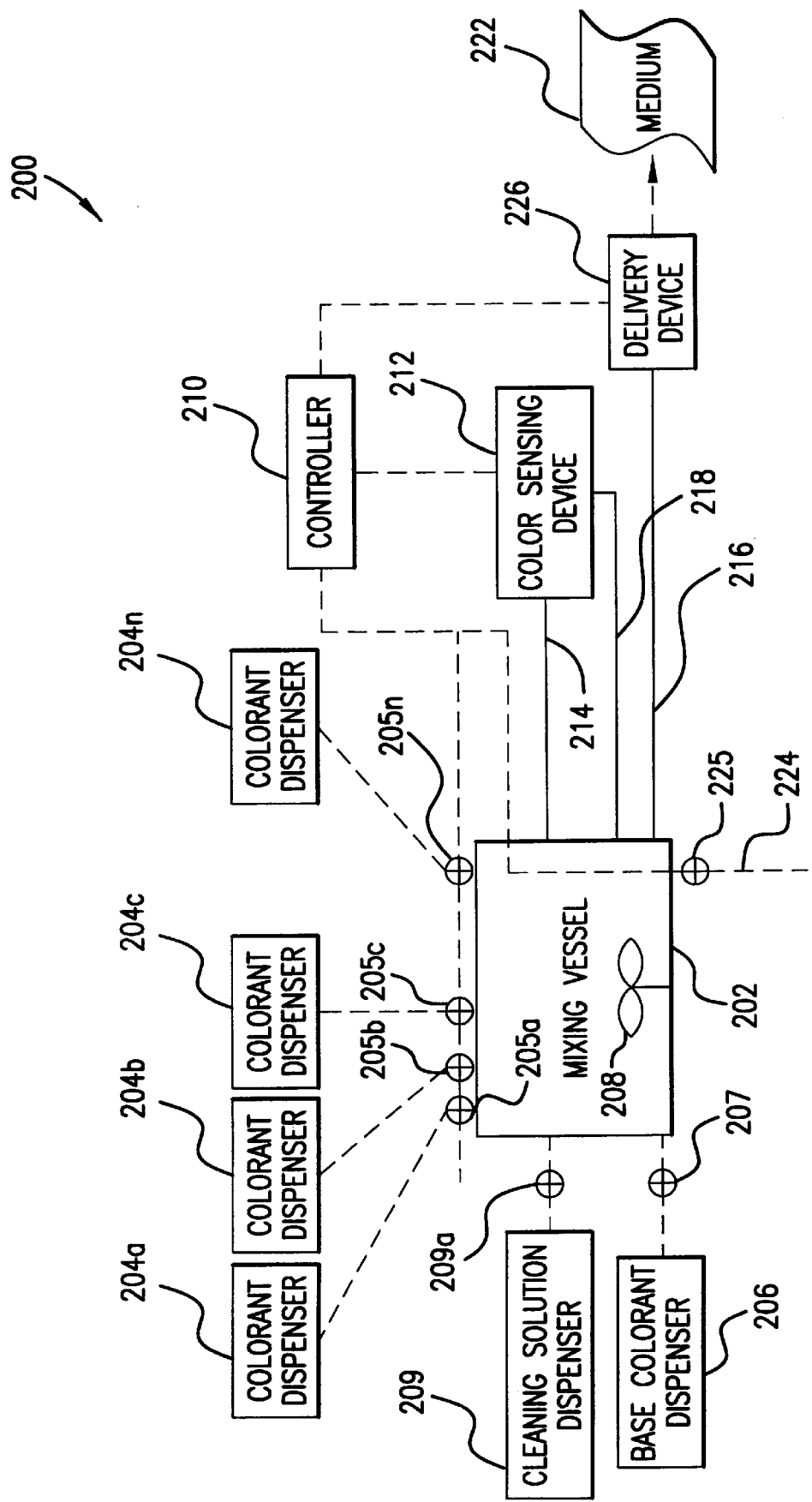
FIG. 2 is a schematic system diagram showing an apparatus according to the invention.

FIG. 2 shows a schematic system diagram of a colorant mixing and delivery apparatus 200 according to the present invention. The colorant mixing and delivery apparatus 200 includes a mixing vessel 202, to which at least two colorant dispensers 204a, 204b, 204c, . . . , 204n are connected. The colorant dispensers 204a, 204b, 204c, . . . , 204n each contain one colorant, and have respective valves 205a, 205b, 205c, . . . , 205n that can be actuated to dispense a known amount (e.g., by weight, volume, dispensing time, etc.) of colorant into the mixing vessel 202.

The mixing vessel 202 may be disposable so that the mixing of each custom color is carried out in a clean container. Alternatively, the mixing vessel 202 may include a disposable sleeve, e.g., made of plastic material, that serves the same function.

The number of colorant dispensers 204a, 204b, 204c, . . . , 204n depends, of course, on the number of distinct primary colorants necessary to create the expected range of target colors. In most applications, fewer than ten primary colors can be used to match all expected target colors. In a typical ink marking device system, as discussed in greater detail below, two to four primary colorants are commonly used in any single colorant mixture. For the purposes of this disclosure, the term "primary colorant" is not restricted to colorants of so-called primary colors, but includes any constituent colorant used in the mixing process to make the target color. In particular, primary colorants can include black, transparent white or opaque white.

In some embodiments, a base colorant dispenser 206 and a valve 207 may be used to dispense a base colorant that is used in creating most colors, and thus is consumed in greater amounts than the other colorants. For example, the base colorant dispenser 206 in a colorant mixing system for household paint may be configured to dispense white paint, which is the predominant colorant of nearly every household target color.

In some embodiments, cleaning solution may be supplied from a cleaning solution dispenser 209 through a valve 209a to clear the mixing vessel 202 between color mixing steps. In other embodiments, the color mixing vessel 202 may be disposable or include a disposable liner.

The mixing vessel 202 includes a mixing element 208, which can be a blade, propeller or other suitable structure for mixing the colorants together to form a homogenous mixture. The mixing vessel 202 also includes a vessel drain line 224 and a valve 225 that are used to drain the vessel 202, particularly if the colorant mixing process must be reinitialized, as is described below in greater detail.

After mixing, the colorant mixture is fed from the mixing vessel 202 through a mixed colorant output line 214. The colorant mixture is then sensed by a color sensing device 212 to determine if the colorant mixture matches the target color, which may have been preselected. If the colorant mixture matches the target color, i.e., if the differences between the colorant mixture and the target color are within a predetermined acceptable range (as described in greater detail below), the colorant mixture becomes the output color and is fed to a delivery device 226 suitable for the particular application via an output color line 216 for application on a medium 222. Alternatively, the colorant mixture can be output onto the media in all cases, with the subsequent applications of the colorant mixture being adjusted to approach the target color.

The above process and apparatus are controlled and monitored by a controller 210. The controller 210 is linked (as indicated by dashed lines) via a wire or a wireless connection to each element of the system, including the valves 205a, 205b, 205c, . . . , 205n, 207, 209a and 225, the color sensing device 212 and the delivery device 226. If the output color does not match the target color, as detected by the color sensing device 212, the controller transmits signals to the one or more of the valves to adjust the color mixture so that it more closely matches the target color.

In a pigment-based color mixing system, components of the resulting mixed color cannot be individually subtracted, as is possible in a light-based color mixing system. Therefore, all adjustments to color of the colorant mixture are additions of one or more colorants. As a result, if a number of successive adjustments are made, the overall volume of the colorant mixture in the mixing vessel may increase significantly. Further, the amount of a particular colorant required to change the colorant mixture by one shade increases as the volume of the colorant mixture increases.

Even if the detected color does not match the target color, the colorant mixture is routed through the return colorant line 218 back to the mixing vessel 202. In this way, the returned colorant mixture can be remixed with the colorant mixture remaining in the mixing vessel 202 so that the entire volume of colorant mixture can be adjusted in color.

Under certain conditions, the colorant mixture may need to be drained from the mixing vessel 202 through the valve 225 and the vessel drain line 224, e.g., if insufficient volume exists within the mixing vessel 202 for receiving additional amounts of colorant(s) required to adjust the color of the colorant mixture. In addition, the mixing vessel can be drained through valve 225 and the vessel drain line 224 for cleaning or other purposes. Cleaning may be programmed to take place with the initial mixing of each new custom color, or at other intervals. Also, the controller may detect whether the existing residual colorant mixture can be used as a starting colorant mixture for a new custom color.

In a preferred embodiment, the color sensing device 212 is a spectrophotometer. The spectrophotometer is configured to sense the transmission spectra of a color sample, which may be the colorant mixture prepared to match the target color as shown and/or the target color (not shown). Alternatively, the spectrophotometer can be configured to measure the reflectance spectra of a color as applied on the medium 222. In the embodiment of FIG. 2, the spectrophotometer measures the transmission spectra of the colorant mixture in a loop outside of the mixing vessel 202.

The spectrophotometer develops a relationship between the intensity and the wavelength of the sensed color. In ink marking device applications, empirical studies suggest that spectrophotometers may be required to discern intensities at as many as 33 or more distinct wavelengths, i.e., 33 distinct points on the spectrum. Commercial spectrophotometers usually provide spectral resolution of 5 nanometers or better in the visible spectrum (400–700 nanometers). White and black primary colorants are of particular concern because they have nearly uniform transmission spectra. In keeping with system requirements, however, spectrophotometers for ink marking device applications must be relatively small in size, inexpensive and, preferably, of an MEMS (micro electrical mechanical systems) construction. The spectrophotometers produced by Micro Parts (Germany) or Ocean Optics are potentially suitable for ink marking device applications.

To determine how to adjust the colorant mixture, the relative proportions of the constituent colorants must be estimated. By measuring the transmission spectra of the colorant mixture, the proportions, e.g., the weight percents or the volume percents, of the constituent colorants are ascertained. The required adjustment to the output color is then made by selectively adding additional amounts of the constituent colorant(s) (while maintaining the amounts of the remaining colorant(s)) and/or adding additional colorants not previously included in the colorant mixture.

Figure 3:
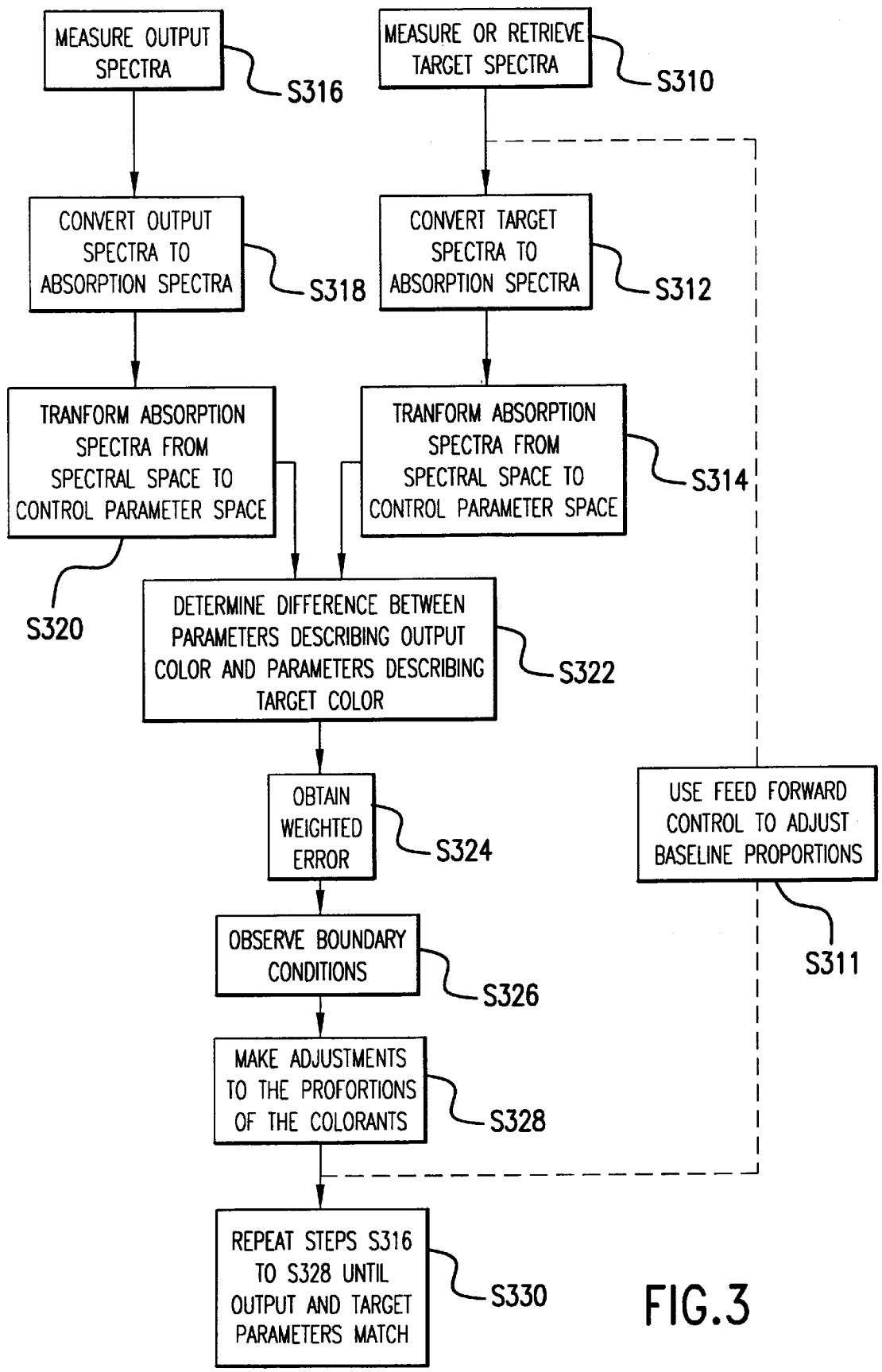
FIG. 3 is a flow chart showing steps of a method according to the invention.

Referring to the flow chart of FIG. 3, a preferred embodiment of the method of the present invention for an ink marking device is shown. In step S310, the transmission spectra $S^{tar}(\lambda)$ of the target color (the "target spectra") is retrieved from memory, e.g., from a look-up table. Alternatively, the target spectra can be measured directly from a reference, e.g., by using the spectrophotometer used to measure the transmission spectra of the output color (the "output spectra"), another spectrophotometer or other suitable device. If the target spectra is initially measured rather than retrieved, it is nonetheless desirable to store it in memory for subsequent retrieval and/or updating.

In step S311, feed forward control is used to adjust the baseline proportions based on the measured or retrieved target spectra. The use of feed forward control accounts for differences in the proportions of colorants to be added that would be determined according to the target spectra alone (i.e., because this information is general to any device). These differences arise because the performance of any particular device deviates from the theoretical generalized standard. In the present embodiment, the use of feed forward control includes referring to a look-up table stored in memory containing adjustment values to account for deviations in the particular device.

In step S312, the target spectra $S^{tar}(\lambda)$ is converted into the target absorption spectra $A^{tar}(\lambda)$ where $$A^{tar}(\lambda) = -\log S^{tar}(\lambda).$$

This step is optional, depending upon the particular configuration of the color sensing device. If the system conforms to Beer's law (i.e., the transmission at each wavelength decreases exponentially as the concentration of each primary colorant increases, with the exponential decay factors depending on both the wavelength and the primary colorant), the natural log of the transmission spectra yields the sum of the linear combination of the absorption spectra. The logarithmic representation of the transmission spectra may also be beneficial because it compresses the dynamic range of the function.

In step S314, the target absorption spectra is transformed from spectral space to parameter space. Specifically, the target absorption spectra $A^{tar}(\lambda)$ is transformed into target control parameters, $\beta^{tar}$, where $$\beta^{tar} = H^{-1} G$$

Where, $$\beta^{tar} = [\beta_1, \beta_2 \ldots \beta_N]^T$$

$$H = [H_{ij}] = N \times N, H_{ij} = \int_{\lambda_{min}}^{\lambda_{max}} \Psi_i^T(\lambda) \Psi_j(\lambda) d\lambda, \text{ and}$$

$$G = [G_1, G_2 \ldots G_N]^T, G_i = \int_{\lambda_{min}}^{\lambda_{max}} A^{tar}(\lambda) \Psi_i(\lambda) d\lambda$$

H is the correlation matrix of the basis functions, and G is the cross-correlation vector of basis functions and spectra. $\Psi_j(\lambda)$ are basis functions defined for the convenience of the above transformations. Further details of the transformation are described below.

Alternatively, the process of steps S310, S312 and S314 can be combined into a single step in which the parameters describing the target color are retrieved from memory directly without the need for the conversion from target spectra to absorption spectra and/or the transformation from spectral space to control parameter space.

In steps S316 to S320, the output spectra $S(\lambda)$ is measured (step S316) and converted to absorption spectra $A(\lambda)$ (step S318), which is then transformed into measured control parameters $\beta$ (step S320), similar to steps S310 to S314, as follows $$\beta = H^{-1} G$$

Where, $$\beta = [\beta_1, \beta_2 \ldots \beta_N]^T$$

$$H = [H_{ij}] = N \times N, H_{ij} = \int_{\lambda_{min}}^{\lambda_{max}} \Psi_i^T(\lambda) \Psi_j(\lambda) d\lambda, \text{ and}$$

-continued $$G = [G_1, G_2 \ldots G_N]^T, G_i = \int_{\lambda_{min}}^{\lambda_{max}} A(\lambda)\Psi_i(\lambda)d\lambda$$

In step S322, the control parameters describing the output color are compared to the control parameters describing the target color. Specifically, an error E representing the difference between the parameters describing the output color (i.e., the output control parameters β) and the parameters describing the target color (i.e., the target control parameters $\beta^{tar}$) is calculated:

$$E=\beta-\beta^{tar}$$

In step S324, the incremental proportions δu by which each constituent colorant must be adjusted are computed as follows $$\delta u=-KE$$

where K is a gain matrix retrieved from memory, e.g., a look-up table. The choice of the gain matrix K depends upon the desired dynamics of the overall closed loop control system, and can be chosen to provide fast convergence of the color output. One approach of determining the gain matrix is using well known pole placement techniques for discrete linear control systems. Alternatively, a non-linear control system could be substituted for the gain matrix K, to provide more precise control as is known in the art.

In step S326, the incremental proportions are evaluated to ensure that all appropriate boundary conditions are observed. As one example, the incremental proportions are evaluated to ensure that the adjustment values are positive:

$$\delta u_{adjust} = 0.5(1 + \text{sgn}(\delta u))\delta u$$

where $$\text{sgn}(\delta u) = \begin{cases} 1 & \text{if } \delta u \geq 0 \\ -1 & \text{if } \delta u < 0 \end{cases}$$

The proportion adjustment values $\delta u_{adjust}$ are then added to the mixing vessel 202.

In step S328, the process in steps S316 to S326 is iterated until convergence occurs. According to one method, convergence is determined when the root mean square error RMSE for the present iteration is greater than for the previous iteration, where $$RMSE = \frac{\|A(\lambda) - A^{tar}(\lambda)\|}{\|A^{tar}(\lambda)\|}$$

where $$\|A(\lambda)\| = \int_{\lambda_{min}}^{\lambda_{max}} A^2(\lambda)d\lambda$$

After convergence is reached, the adjustments to the proportions of the various colorants are modified to account for the deviations in the particular system from the generalized standard as indicated by the dotted line input from step S311. In step S330, signals representing the adjustments to be made to the proportions of the colorants δu are transmitted by the controller 210. In the embodiment of FIG. 2, these signals are transmitted to one or more of the valves 205a, 205b, 205c, ..., 205n, 207, 209 and 225 for adjusting the weights/volumes of the respective colorants.

The transformation from absorption spectra to measured control parameters mentioned above is accomplished by using one or more of the following orthogonal basis functions, quasi-orthogonal functions or any other suitable function, e.g., a function obtained from experimental input-output data, depending upon the particular system conditions. This experimental data consists of a measured transmission spectra value taken at regular intervals for all possible combinations of the expected range of the color mixture. The experimental data is conveniently represented in matrix form, and can be stored in a look-up table as described below.

Figure 4:
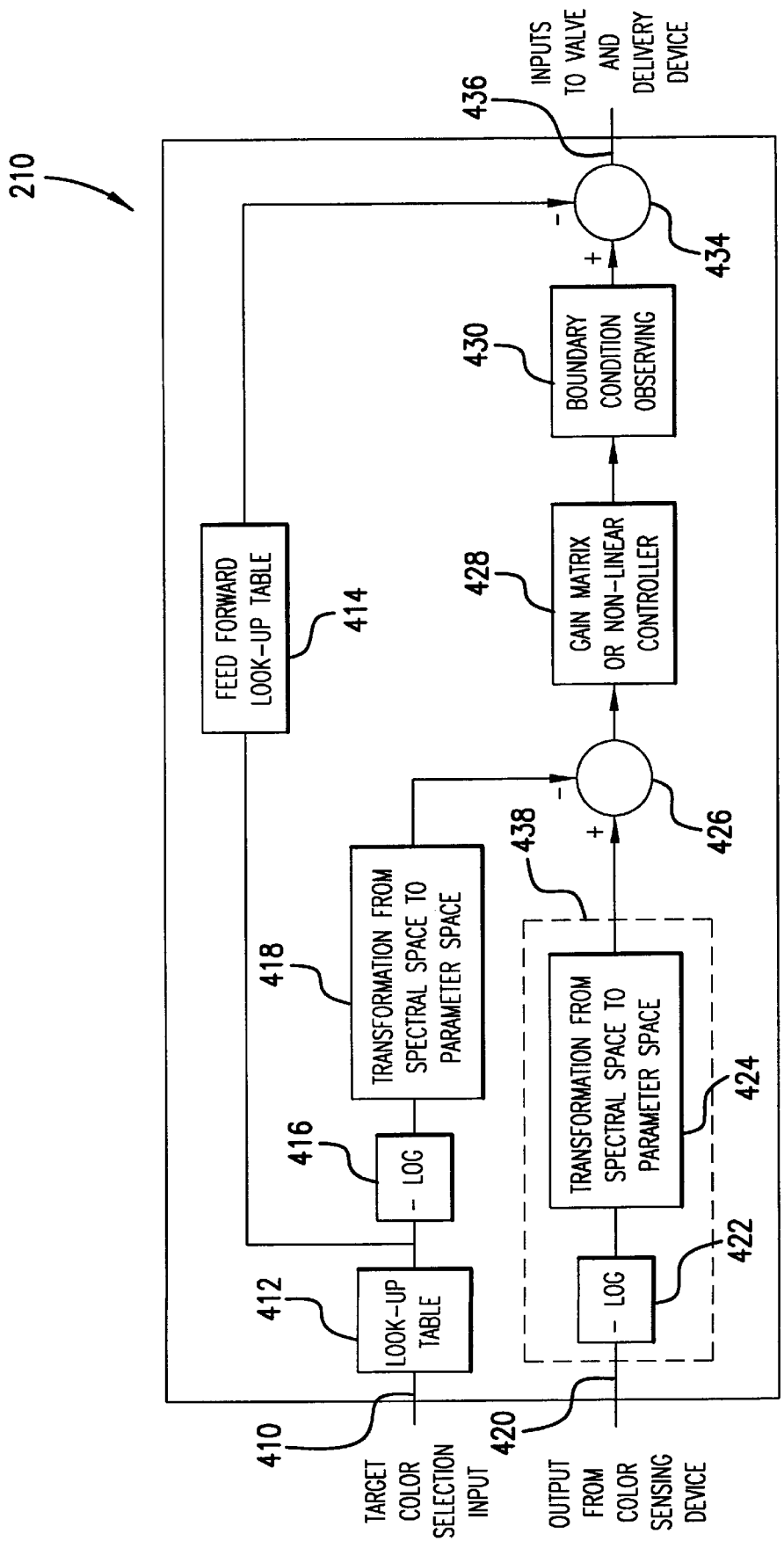
FIG. 4 is a diagram showing the structure and operations performed by a controller of the apparatus according to the invention.

Referring to FIG. 4, the detailed structure of and functions performed by the controller 210 are shown. The controller 210 receives a target color selection input 410, e.g., as inputted by a customer, to identify the target color to be matched. For example, a color from the Pantone color matching system could be specified by its Pantone number. Using the target color selection input 410, a look-up table 412 is accessed to obtain the target color transmission spectra of the particular chosen color.

The target color transmission spectra is converted to target absorption spectra in a logarithmic operator 416. The output of the logarithmic operator 416 is fed to a transformation block 418 that transforms the target absorption spectra from spectral space to control parameter space using, e.g., the equations described above in connection with step S314. As also described above, the logarithmic operator 416 can be omitted. Further, the target color selection input can trigger accessing the target color parameters that have already been converted into parameter space directly without the intervening logarithmic operator 416 and the transformation block 418.

The output of the look-up table, i.e., the target color spectra or target color control parameters, is fed forward to a feed forward look-up table 414 containing device specific quantities for modifying the proportion adjustment amounts to be determined.

The output from the color sensing device 420, which is the output color transmission spectra, is fed to a logarithmic operator 422. The function of the logarithmic operator is to convert the output color transmission spectra to output color absorption spectra, which is in turn transformed from spectral space to parameter space by the transformation block 424.

The logarithmic operator 422 and the transformation block 424 together can be regarded as a control parameter sensor 438. In the case of a system in which the colorant proportions are determined by their volumes, the control parameter sensor 438 is a volume sensor. The control parameter sensor may be used alone in certain applications, without the control provided by comparison with the target color control parameters, e.g., for monitoring the output color of the colorant mixture. More advanced mathematical description of the system could be used in place of the algorithms performed in the transformation block 424 to obtain accurate control parameter sensing when the control parameter sensors are used with and without closed loop controls.

The logarithmic operator 422 is similar to the logarithmic operator 416, and the transformation block 424 is similar to the transformation block 418.

At a summing node 426, the output of the transformation block 418 is subtracted from the output of the transformation block 424 to yield the error signal, as described above in connection with step S322.

The steps S324 and S326 are performed by a boundary condition observing block 430. The process is repeated until the output color matches the target color, e.g., until the difference between the parameters describing the output color and the parameters describing target color are within an acceptable predetermined limit.

At a summing node 434, the output of the boundary condition observing block 430, which is the proportion adjustment values, is summed with the values from the feed forward look-up table to modify the proportion adjustment values for the particular characteristics of the device. Summing node outputs 436 are sent as inputs to the valves 205*a*, 205*b*, 205*c*, ..., 205*n*, 207, 209*a*, 225 and the delivery device 226 to adjust and/or output the output color.

Although the invention has been described in connection with preferred embodiments, the invention is not limited to the disclosed embodiments. On the contrary, the application is intended to cover all alternatives, modifications and equivalents that may be included within the spirit and scope of the invention, as defined by the independent claims.

What is claimed is:

1. A method of mixing colorants to achieve a target color, comprising:

combining individual colorants;

detecting an output color of the combined colorants with a color sensing device; and automatically adjusting the output color based on comparison between the detected output color and the target color;

wherein the step of adjusting includes transforming transmission spectra from spectral space to control parameter space and the transforming includes calculating control parameters $\beta$:

$$\beta = H^{-1} G$$

wherein H is a correlation matrix of basis functions and G is a cross-correlation vector of basis functions and spectra.

2. The method of claim 1, wherein the step of adjusting includes adjusting a proportion of at least one of the individual colorants.

3. The method of claim 1, wherein the step of adjusting includes adjusting at least one of a weight and a volume of at least one of the individual colorants.

4. The method of claim 1, wherein the step of adjusting the output color includes adding at least one colorant.

5. The method of claim 1, wherein the step of adjusting the output color includes subtracting a portion of the combined colorants.

6. The method of claim 1, wherein the step of adjusting includes adding a new colorant not previously present among the combined colorants.

7. The method of claim 1, wherein the step of adjusting includes adding a cleaner.

8. The method of claim 1, wherein the step of combining includes mixing the colorants in a container.

9. The method of claim 1, wherein the color sensing device is a spectrophotometer and the step of detecting includes measuring at least one of transmission spectra of the target color and reflectance spectra of the target color with the spectrophotometer.

10. The method of claim 1, wherein the color sensing device is a spectrophotometer and the step of detecting includes measuring at least one of transmission spectra of the output color and reflectance spectra of the output color with the spectrophotometer.

11. The method of claim 1, further comprising the step of outputting the output color onto a medium, wherein the steps of adjusting and outputting occur concurrently.

12. The method of claim 1, wherein the step of adjusting includes converting transmission spectra into absorption spectra.

13. The method of claim 1, wherein transforming transmission spectra from spectral space to control parameter space includes representing the transmission spectra with at least one of orthogonal basis functions, quasi-orthogonal basis functions, wavelet transforms and functions obtained from experimental input-output data.

14. The method of claim 1, wherein the control parameters $\beta$ correspond to output color transmission spectra in control parameter space, and $\beta^{tar}$ is a vector of control parameters corresponding to target color transmission spectra in control parameter space, further comprising computing an error signal E, where $$E = \beta - \beta^{tar}.$$

15. The method of claim 14, wherein the step of adjusting includes multiplying the error signal E by a gain matrix K.

16. The method of claim 15, wherein the step of adjusting includes ensuring proportion adjustments are not negative.

17. The method of claim 16, wherein the step of adjusting is performed repeatedly until a difference between control parameters describing the output color and control parameters describing the input color is less than a predetermined value.

18. The method of claim 1, wherein the step of adjusting includes using feedback control to converge a difference between the output color and the target color.

19. The method of claim 1, wherein the step of adjusting includes detecting initial conditions.

20. The method of claim 19, wherein the step of combining occurs in a container and the step of detecting initial conditions includes detecting contents of the container.

21. An apparatus for mixing colorants to achieve a target color, comprising:

a plurality of colorant dispensers for the colorants to be mixed;

a container that is capable of receiving the colorants to be mixed;

a color sensing device, the color sensing device being capable of detecting an output color of a colorant mixture; and a controller linked to each of the plurality of colorant dispensers and operatively connected to the color sensing device, wherein the controller adjusts the output color to match the target color based on a signal received from the color sensing device by outputting a signal to at least one of the plurality of colorant dispensers indicating an amount of colorant to be added to the container;

wherein the controller includes a transformation block that transforms transmission spectra from spectral space to control parameter space and yields an output of control parameter $\beta$:

$$\beta = H^{-1} G$$

wherein H is a correlation matrix of basis functions and G is a cross-correlation vector of basis functions and spectra.

22. The apparatus of claim 21, wherein the signal output by the controller to the colorant dispenser is one of a weight and a volume.

23. The apparatus of claim 21, wherein container includes a drain activated by a drain valve linked to the controller, and wherein the controller outputs a signal to actuate the valve.

24. The apparatus of claim 21, wherein the color sensing device is a spectrophotometer, and the signal received by the controller from the color sensing device is one a transmission spectra of the output color and a reflectance spectra of the output color.

25. The apparatus of claim 21, wherein the controller includes a conversion block that converts transmission spectra into absorbtion spectra.

26. The apparatus of claim 21, wherein the controller includes a comparator that yields an error signal E, where $$E=\beta-\beta^{tar}$$

and $\beta^{tar}$ is a vector of coefficients corresponding to the target spectra in control parameter space.

27. The apparatus of claim 26, wherein the controller includes a multiplier that multiplies the error signal E by a gain matrix K to yield a weighted error.

28. The apparatus of claim 21, wherein the color sensing device is linked to the controller by a feedback loop, and wherein signal received by the controller from the color sensing device is closed loop feedback.

29. The apparatus of claim 21, wherein the container is disposable.

30. The apparatus of claim 21, wherein the container includes a disposable liner.

31. An apparatus for mixing inks to achieve a target color, comprising:
- a plurality of colored ink dispensers for the inks to be mixed;
- a container that is capable of receiving the inks to be mixed;
- a color sensing device, the color sensing device being capable of detecting an output color of an ink mixture; and
- a controller linked to each of the plurality of colored ink dispensers and operatively connected to the color sensing device, wherein the controller adjusts the output color to match the target color based on a signal received from the color sensing device by outputting a signal to at least one of the plurality of colored ink dispensers indicating an amount of colorant to be added to the container, and wherein the controller includes a transformation block that transforms transmission spectra from spectral space to control parameter space and yields an output of control parameter $\beta$:

$$\beta=H^{-1}G$$

wherein H is a correlation matrix of basis functions and G is a cross-correlation vector of basis functions and spectra.

32. A printing apparatus, comprising:
a) a colorant mixing device, for mixing colorants to achieve a target color, comprising:
- a plurality of colored ink dispensers for the inks to be mixed;
- a container that is capable of receiving the inks to be mixed;
- a color sensing device, the color sensing device being capable of detecting an output color of an ink mixture; and
- a controller linked to each of the plurality of colored ink dispensers and operatively connected to the color sensing device, wherein the controller adjusts the output color to match the target color based on a signal received from the color sensing device by outputting a signal to at least one of the plurality of colored ink dispensers indicating an amount of colorant to be added to the container, and wherein the controller includes a transformation block that transforms transmission spectra from spectral space to control parameter space and yields an output of control parameter $\beta$:

$$\beta=H^{-1}G$$

wherein H is a correlation matrix of basis functions and G is a cross-correlation vector of basis functions and spectra; and b) an image output device for printing an image using said target color on a recording medium.

* * * * *